3 Sheets—Sheet 2.
A. E. STIRCKLER.
Machine for Trimming and Burnishing
Boot and Shoe Heels.
No. 212,116. Patented Feb. 11, 1879.
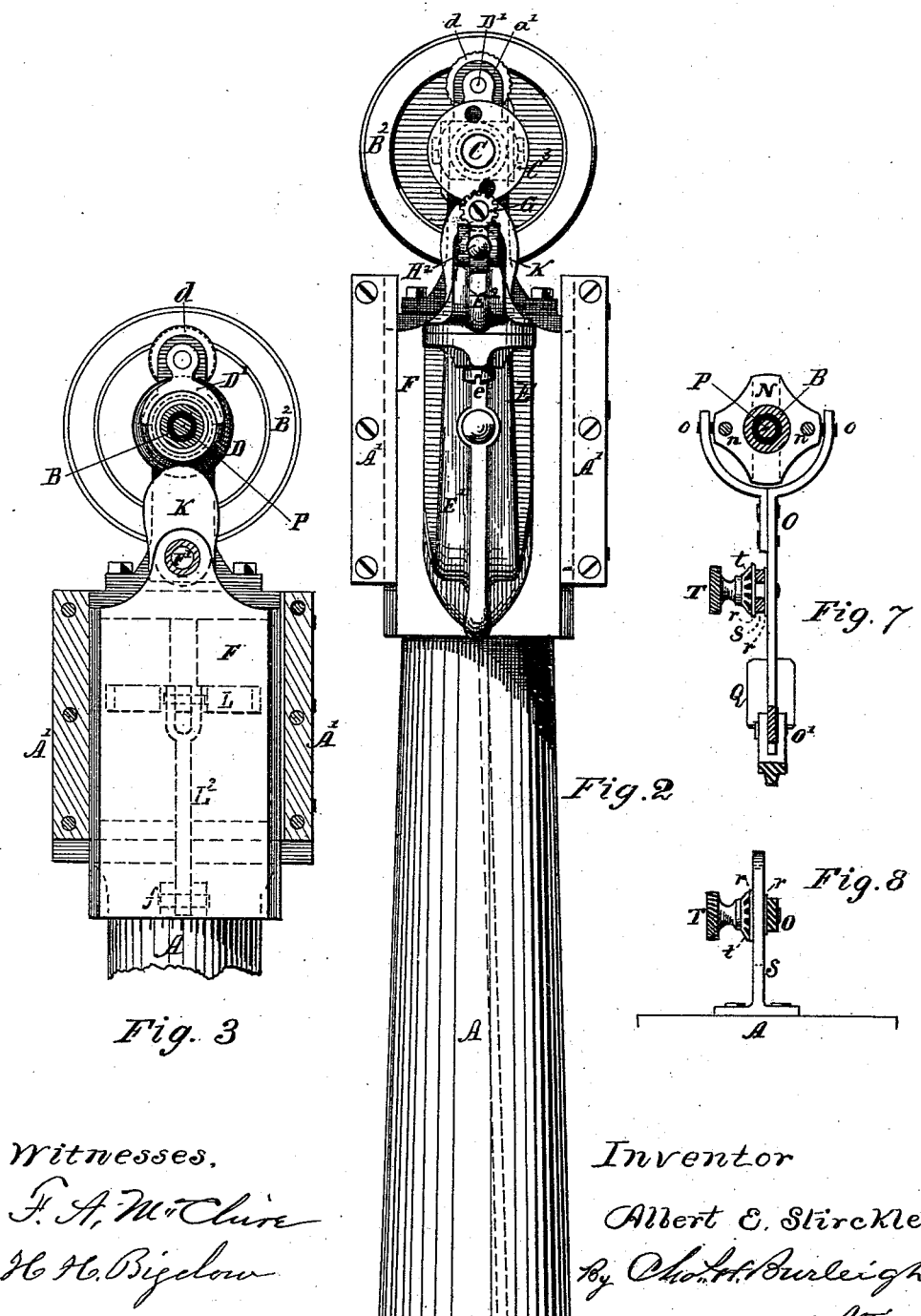
Witnesses,
F. A. McClure
H. H. Bigelow
Inventor
Albert E. Stirckler
By Chas. H. Burleigh
Atty.

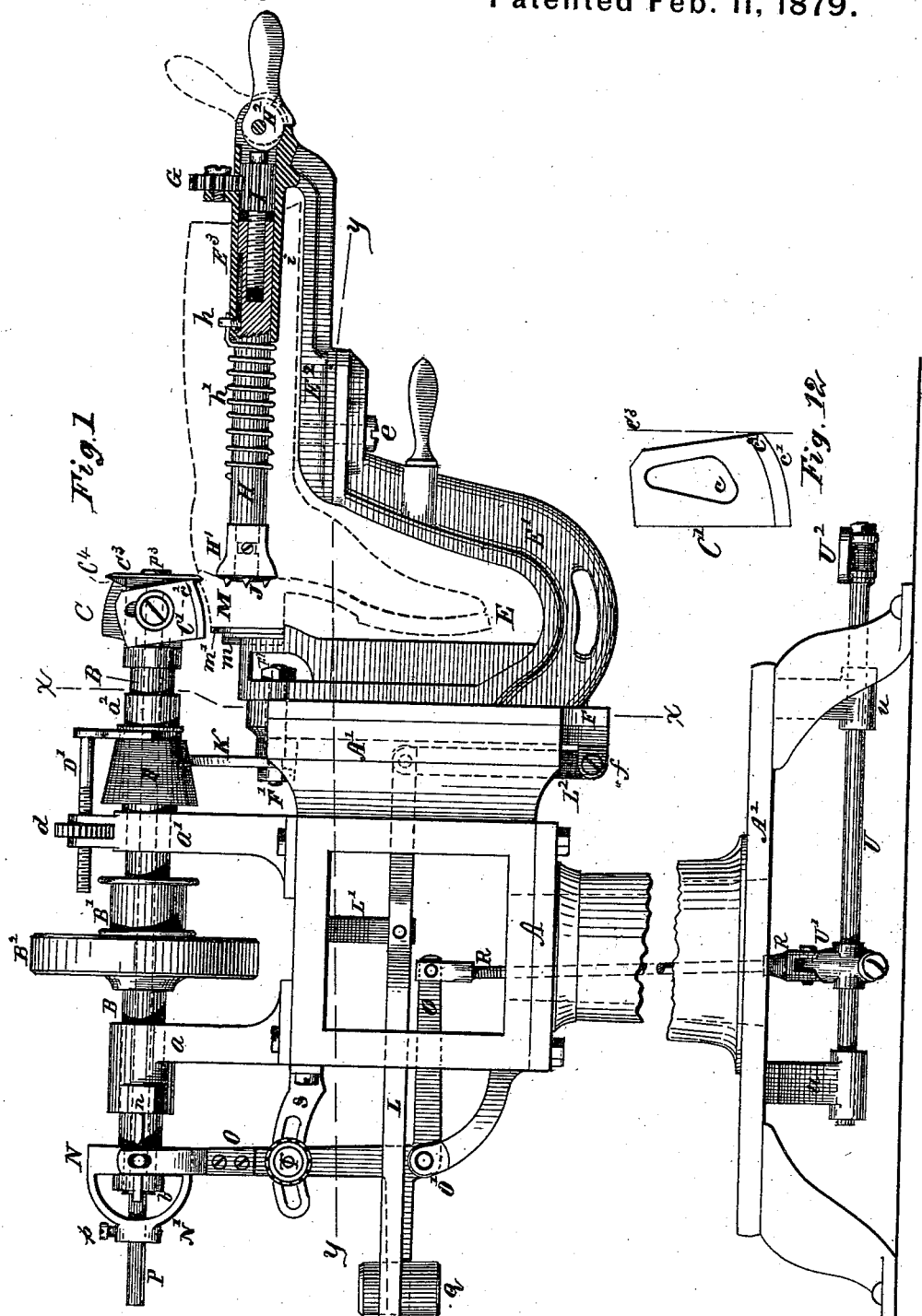

A. E. STIRCKLER.
Machine for Trimming and Burnishing
Boot and Shoe Heels.
No. 212,116. Patented Feb. 11, 1879.
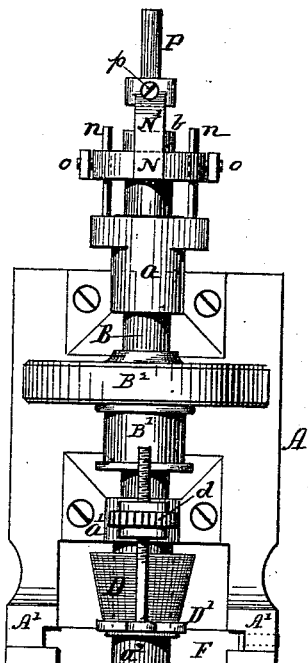
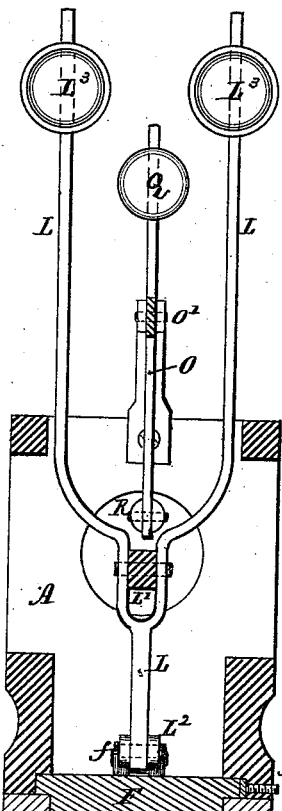
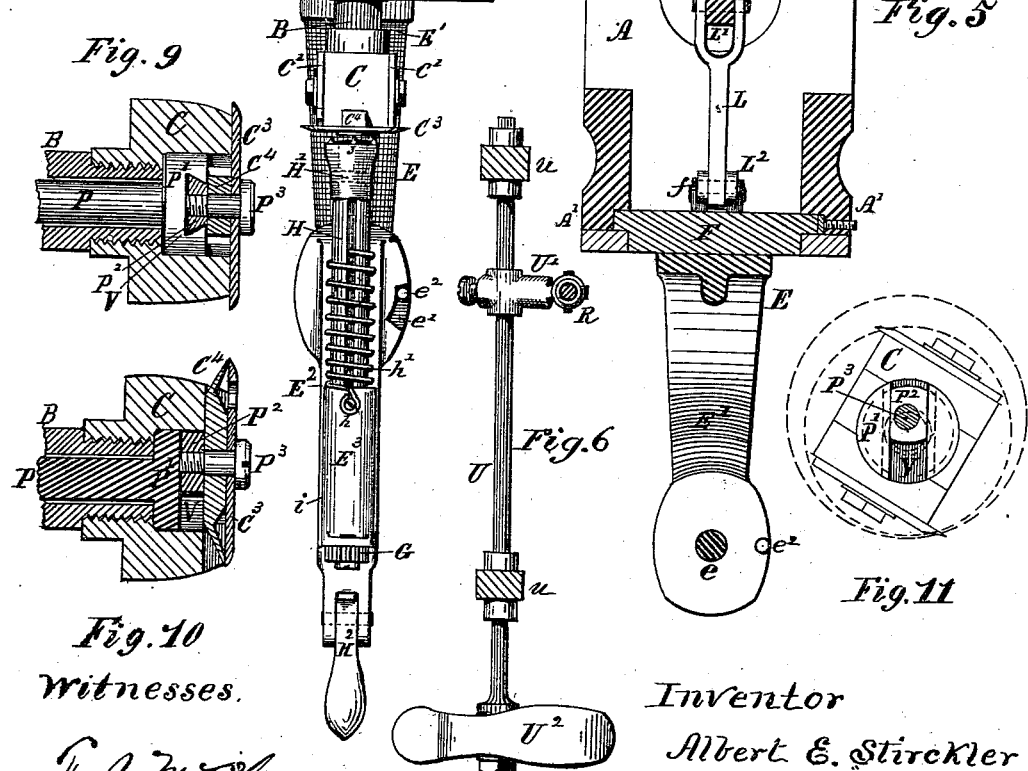

UNITED STATES PATENT OFFICE.

ALBERT E. STIRCKLER, OF WORCESTER, MASSACHUSETTS, ASSIGNOR TO HORACE H. BIGELOW, OF SAME PLACE.

IMPROVEMENT IN MACHINES FOR TRIMMING AND BURNISHING BOOT AND SHOE HEELS.

Specification forming part of Letters Patent No. 212,116, dated February 11, 1879; application filed June 29, 1878.

*To all whom it may concern:*

Be it known that I, ALBERT E. STIRCKLER, of Worcester, in the county of Worcester and State of Massachusetts, have invented certain new and useful Improvements in Machines for Trimming and Burnishing Heels of Boots and Shoes; and I declare the following to be a description of my said invention sufficiently full, clear, and exact to enable others skilled in the art to which it appertains to make and use the same, reference being had to the accompanying drawings, which form a part of this specification, and in which—

Figure 1 represents a side view of my improved machine for trimming and burnishing heels of boots and shoes, the jack-spindle being shown in section. Fig. 2 represents a front view of the same. Fig. 3 represents a vertical section at line $x\ x$, Fig. 1. Fig. 4 represents a plan view of the top of the machine. Fig. 5 represents a horizontal section at line $y\ y$, Fig. 1. Fig. 6 represents a plan view of the treadle mechanism. Figs. 7 and 8 show detail views of the treadle-connecting devices at the head of the shaft. Figs. 9, 10, and 11 are sectional and front views of cutter-head mechanism, showing eccentric adjustment devices for the welt-cutter and guard. Fig. 12 represents one of the knives or blades for trimming heels.

My invention relates to certain improvements in machinery for trimming and burnishing the edges of boot and shoe heels, one feature whereof consists in mechanism for shaping and grading the heels to different sizes by the employment of a pattern-plate for giving proper contour or face form and adjustable cutters or knives for imparting proper bevel or curvature to the edge surface, and an adjustable conical roll-guide, whereby the size of the heels may be graded or varied without change in the face contour or inclination of the bevel, as hereinafter described.

Another feature consists in the employment, in combination with the reciprocating rotating shaft which carries the cutter-head, of a rocking treadle and connecting mechanism arranged for imparting both forward and backward movement to the shaft, as hereinafter described, whereby the operator is enabled to govern the action of said shaft by a simple movement of his foot while his hands are occupied in working the jack device.

Another feature consists in a boot-support or jacking mechanism constructed and arranged for operation as hereinafter described; also, in devices for adjusting and actuating the jack-spindle; also, in the throating out of the jack-head for the legs of long boots; and in the peculiar devices for counterbalancing, as hereinafter explained.

Another feature consists in the peculiar device for eccentrically adjusting the center which supports the welt-cutter, whereby the trimming-cutter and welt-cutter may occupy eccentric positions relatively while revolving in unison, as hereinafter more fully described.

Other parts or features of my invention will be understood from the following detailed description, the subject-matter claimed being hereinafter definitely specified.

In the drawings, A denotes the main frame, of suitable form and material for supporting the working mechanism. B indicates the operating-shaft, which carries the cutter-head C. Said shaft B is formed hollow, and is supported in bearings $a\ a^1$ at the top of the frame A. It is provided with a driving-pulley, $B^1$, and balance-wheel $B^2$, and is arranged to have longitudinal reciprocative movement through its bearings $a\ a^1$, at the pleasure of the operator, by actuation of the treadle mechanism.

The cutter-head C is screwed to the forward end of the shaft B, and can be interchanged with a burnisher-head, if desired.

The forward bearing, $a^1$, is provided with a cylindrical front extension or sleeve, $a^2$, surrounding the shaft B, and supported thereon is a conical roll or guide, D, adjustable in the direction of its axis, and provided with a fork and screw, D', which extends through a hand-wheel nut, $d$, working between ear-pieces on the bearing $a^1$, and by means of which adjustment of the conical guide-roll can be readily and accurately effected.

E denotes the boot-support or jack mechanism, consisting of the curved frame $E^1$, fitted against and pivoted to the slide or carrier F, which works up and down between the guides or ways $A^1$, attached to the forward upper portion of the main frame A, as shown.

An oscillating head-piece, $E^2$, is pivoted, at $e$, to the outer arm of the jack-frame $E^1$, which head-piece $E^2$ is provided with a sleeve, $E^3$, in which the jack-spindle H is supported in the manner shown, said spindle H being arranged to have longitudinal reciprocative movement within the sleeve $E^3$, but held from rotative movement by a groove in the spindle and a stud, $h$, fixed in the sleeve, with its end working in said groove.

Below the sleeve $E^3$ the head-piece $E^2$ is provided with an opening or recess, as indicated at $i$, allowing sufficient space for the leg of a long-topped boot (see dotted lines, Fig. 1) without the necessity of spreading the frame $E^1$ to an inconvenient extent, or of leaving too great a portion of the jack-spindle H unsupported.

The head-piece $E^2$ is permitted limited lateral movement in one direction on its pivot-stud $e$ by the slot or space $e^1$ in one of the bearing-plates, and a stop pin or lug, $e^2$, in the other. (See Fig. 4.) Said pin $e^2$ may be made adjustable to a slight degree, so as to arrest the movement of the head-piece $E^2$ at an exact central position, or at a position a little to one side or the other of the center, as desired.

The jack-spindle H is provided with a head, $H^1$, of suitable face form to rest on the inner heel-seat of the boot, and thereby hold the work in position on the jack. Said spindle-head is furnished on its bearing-face with spurs J, or projections, to prevent its slipping on the leather.

The rear end of the spindle H is formed with a telescope screw and gear, I, and at the outside of the sleeve $E^3$ is a hand-wheel gear, G, meshing therewith.

By operating the hand-wheel G the length of the jack-spindle H between the head $H^1$ and pressure-cam $H^2$ can be varied. (See section, Fig. 1.)

The pressure-cam $H^2$ is pivoted between ears formed on the outer end of the head-piece $E^2$ in line with the spindle H.

When the handle of the cam $H^2$ is raised, as per dotted lines, Fig. 1, the spindle H is drawn back by the action of the spring $h'$, and when the cam-handle is brought down to the position shown in full lines, the cam presses against the rear end of the spindle H or its screw-extension I, and forces it forward, clamping the boot-heel M firmly between the head of the spindle $H^1$ and the seat-plate $m$ on the upper inner portion of the jack-frame $E^1$.

The jack mechanism is arranged to oscillate in a plane perpendicular to the axis of the shaft B, for carrying the heel-edge in contact with the revolving head C, the movement of the pivot $F'$ and carrier F being governed by the pattern-plate K in a manner similar to that described in my Letters Patent No. 194,115, dated August 14, 1877. In the present instance, however, the pattern-plate K works against the adjustable conical roll D as a guide, and different-sized heels can be trimmed to the same pattern by simply adjusting the conical-roll guide D so that the edge of the plate K works against the larger or smaller part of said roll, thus giving a uniform style or form to all the heels, whether on the large or small sized boots.

The trimming-cutters $C^1$, I make of the peculiar shape shown in Fig. 12, with a triangular or irregular shaped slot or opening, $c$, for the holding-bolt, the cutting-edge $c^1$ being ground to the desired curvature. These knives are bolted to the square-sided cutter-head C, similar to ordinary molding-machine cutters, except that the peculiar form of the slot $c$ permits of the cutter being readily adjusted to cut or trim the heels at different bevels or degrees of inclination without regrinding the curvature of the cutting-edge, and without changing the working position of the corner $c^2$, where the cutter $C^1$ sets against the welt-guard disk $C^3$.

By the use of the conical-roll guide D, the oscillating jack and pattern-plate K, and the adjustable cutters $C^1$, constructed and operating as set forth, heels can be formed and graded to sizes in a very convenient and accurate manner. This mechanism is eminently adapted for the production of graded patterns from which to cast dies or molds such as are used in the Bigelow heel-compressing machines, since it is only necessary to use a pattern-plate K of the shape required for the tread of the heel, and to grind and adjust the cutters to any curvature and bevel desired. Then, by placing the blocks in the position of the heel M, a uniform set of heel-patterns can be quickly turned out, the several sizes being graded by adjustment of the roll D. By this method an entire set of mold-patterns can be made at less expense than a single one costs when made in the ordinary manner.

A leather lift, $m'$, is used on the face of the seat-plate $m$, which, being of the full size of the heel M, prevents any upsetting at the corner of the heel without liability of dulling the cutters, the metal seat-plate $m$ being smaller and out of reach of the cutters, while giving the requisite support for clamping the heel M firmly in position.

The jack mechanism and its sliding carrier F are counterbalanced, the weighting devices being constructed in the peculiar manner illustrated.

A forked lever, L, is fulcrumed to the hanger $L^1$ near the central part of the main frame A. The front end of said lever L is connected to ear-pieces $f$ on the lower rear part of the slide F by the link-piece $L^2$ and joint-pivots, as shown, while the balance-weights $L^3$ are placed on the backward-projecting arms of the lever L, where said weights are readily adjustable to accurately counterpoise or to preponderate to any desired degree the working parts, while the link-connection at the forward end draws on the slide with a direct upward strain, and the forked rear part of the lever allows a free space for the actuating-lever from the treadle and its balance-weight, thus forming a sensitive and easily-operated balance device.

At the rear end of the operating-shaft B is a sliding head, N, working on guide-pins $n$, which project from the bearing-stand $a$ parallel with the axis of said shaft B. This head is fitted to a groove in the end of the shaft or held thereto by a collar, $b$, and is also provided with a bow or yoke, N', in which the central stationary spindle or rod, P, is held by the set-screw $p$, while at the sides of said head N pins $o$ $o$ project, and engage with slots in the forked portion of the actuating-lever O, by means of which the shafts B and P are reciprocated. Lever O is made in bell-crank form, fulcrumed at O' to a projecting arm of the frame A, and provided with a backward extension, on which is mounted a balancing-weight, Q. The main arm of said lever extends to the central part of the frame A, and is connected to the treadle device by means of a rod, R, passing down within the column of the frame A, as illustrated. A friction device is combined with the lever O, as illustrated in Figs. 1, 7, and 8, consisting of a slotted arm, S, projecting from the frame A, bearing washers $r$ $r$, an adjusting set-screw, T, for clamping the parts together, and a pressure-spring, $t$, for giving elastic tension sufficient for retaining the mechanism at any position, while permitting of its easy movement by pressure from the treadle-rod R.

Beneath the base $A^2$ of the frame A, and supported in suitable bearings $u$ $u$, is a rocker-shaft. U, connected by crank-arm $U^1$ with the rod R, and having at its forward end, which projects at the front of the machine, a rocking foot plate or treadle, $U^2$. The operator, by placing his foot on the plate $U^2$, has control of the reciprocative movement of the shaft B in both directions, and can, by depressing his toe, throw the shaft forward, or, by depressing his heel, move the shaft back, thus readily bringing the cutter-head C to such position that the guard-disk $C^3$ will enter the crease between the upper and sole of the boot regardless of the thickness of heel, or he can vary the position of the shaft and cutter while working, to accommodate any variation in thickness at different parts of the same heel. This latter feature is of considerable importance in the practical working of trimming-machines.

Figs. 9, 10, and 11 illustrate my improved device for eccentric adjustment of the welt-cutter and guard-disk center. The central stationary shaft, P, which extends through the hollow revolving shaft B, is provided with a head or face plate, $P^1$, in which is formed a transverse dovetailed groove, V. Within this groove V is fitted a slide block or nut, $P^2$, which latter supports the screw stud or axis $P^3$, on which the welt-cutter $C^4$ and disk $C^3$ revolve. The screw-stud $P^3$ is made to clamp the slide $P^2$ at any desired position within the groove V, so that any required degree of excentricity can be attained, the adjustment being effected by loosening the screw-stud $P^3$, moving the parts to the desired position, and then retightening the stud. The welt-cutter $C^4$ is of rectangular form, and is let into a groove in the face of the main cutter-head C, to cause it to revolve in unison therewith.

If preferred, the welt-cutter $C^4$ and guard-disk $C^3$ may be hung directly upon the end of the central shaft, P, without the eccentric adjustment devices $P^3$ V.

An index or scale may be used in connection with the screw device D' $d$, to facilitate the quick adjustment of the conical-roll guide D to the proper positions for the various sizes of heels in use. It will also be understood that the pattern-plates K are readily interchangeable for the different forms by simply loosening the holding-nut.

In placing the boot or shoe in position to be trimmed, the head-piece $E^2$ of the jack is moved so as to bring the head $H^1$ of the spindle H toward one side of the machine, and the boot-leg is passed over said spindle H, which is then swung back to bring the heel into position on the seat-plate $m$. The cam-lever is then depressed to clamp the heel M in place, the length of the spindle being previously adjusted in accordance with the thickness of the heel. The jack is then oscillated about the axis of the pivot-bolt F', to bring all parts of the heel-edge into contact with the cutters or working-tool.

It will be observed that the cutters $C^1$ have wide cutting-edges $c^1$, and that the construction and arrangement of the cutter-head and blades $C^1$ are such that heels of various thicknesses can be trimmed with the same cutters with equal facility, and without changing their adjustment, said cutters being adapted for thick or thin heels of similar bevels; also, that the same cutters $C^1$ may be adapted, by simple adjustment, (or swinging outward from the corner position $c^2$,) to cut any ordinary bevel required for the edges of heels.

The welt-guard disk $C^3$ and welt-cutter $C^4$, by being supported on the independent stationary center, can readily be adjusted to run close against the end of the cutter-head C, or so as to have a greater or less degree of looseness, thus enabling the disk $C^3$ to vibrate at the edge. The guard $C^3$ and cutter $C^4$ can then accommodate themselves to the irregularities of the groove between the upper and sole. The welt-trimmer and guide-disk can thus be adapted to remove the welt with a clear cut on all classes of work.

It will also be seen that the opening or space beneath the spindle of the jack permits of high-topped boots being trimmed without the necessity of turning down the tops before placing them on the machine.

Similar jack mechanism without the backward extension and recess $i$ can be used when only shoes are to be operated upon.

What I claim as of my invention, and desire to secure by Letters Patent, is—

1. In a machine for trimming or forming heels or heel-patterns, the combination of the following-named elements, viz: a heel-supporting mechanism or jack having reciprocating and oscillating movement, a pattern-plate or face-form connected to and working with said jack mechanism to govern its reciprocating movement, a revolving cutter-head with cutters adjusted to trim the edge bevel or curve, and an adjustable conical or tapered guide for the pattern-plate, whereby heels may be graded to different sizes without alteration in the general form and bevel, substantially as hereinbefore set forth.

2. In combination, as hereinbefore described, the reciprocating carrier or slide F, the oscillating heel-supporting jack E, the pattern-plate K, working with said jack, the revolving cutter-head C, and adjustable conical roll D, for the purposes set forth.

3. In combination with the shaft-bearing $a^1$, provided with ear pieces and extension-sleeve $a^2$, the forked screw D' and hand-wheel nut $d$, for adjusting and retaining the guide or conical roll D, in the manner set forth.

4. The combination, with the reciprocating shaft B, carrying the cutter head or tool C, the sliding head N, and lever O, of the rod R, rocker-shaft U, and foot-treadle $U^2$, arranged for operation substantially as and for the purposes set forth.

5. In combination with the hollow shaft B, inner shaft, P, and actuating-lever O, the head N, mounted to slide on the guides or pins $n$, grooved to the end of the shaft B, and having the yoke N', for retaining said inner shaft, P, substantially in the manner set forth.

6. The jack or boot-support E, consisting of the oscillating curved frame $E^1$, pivoted at F', the head-piece $E^2$, pivoted to said frame at $e$, and provided with spindle-supporting sleeve $E^3$ and open space or recess $i$, substantially as and for the purpose set forth.

7. In combination, substantially as set forth, the jack-frame $E^1$, head-piece $E^2$, reciprocating spindle H, pressure-cam $H^2$, heel-seat plate $m$, and spring $h'$, for the purposes stated.

8. In combination with the supporting-sleeve $E^3$, reciprocating spindle H, and cam $H^2$, the telescope screw and gear I and hand-wheel gear G, for the purpose set forth.

9. In combination with the frame A and jack-carrying slide F, the link $L^2$, connected with the lower rear part of said slide, the forked lever L, fulcrumed on the hanger $L^1$, and the counter-weights $L^3$, when arranged in the peculiar manner shown and described.

10. The combination, with the revolving head C and welt-guard disk $C^3$ in a heel-trimming machine, of the cutting blade or blades $C^1$, made and attached in the manner shown, with the triangular or irregular shaped slot or opening $c$, whereby adjustment can be effected to cut different bevels without changing the working position of the corner $c^2$ next the welt-guard, as set forth.

11. In combination, substantially as hereinbefore described, the revolving cutter-head C, supported on hollow shaft B, the central stationary shaft, P, having grooved head or face plate $P^1$ V, sliding block or nut $P^2$, screw stud or axis $P^3$, welt-cutter $C^4$, and welt-guard $C^3$, as set forth.

12. In combination, substantially as set forth, the square-sided cutter-head C, mounted on a hollow shaft and having adjustable cutters $C^1$, the welt-cutter $C^4$, fitted into the end of said head, and the welt-guard disk $C^3$, supported on an independent stationary shaft or center, whereby said guard and cutter are adjustable to run more or less closely to the end of the head.

Witness my hand this 7th day of May, A. D. 1878.

ALBERT E. STIRCKLER.

Witnesses:
CHAS. H. BURLEIGH,
C. C. BALDWIN.